United States Patent
Stier et al.

[15] 3,674,083
[45] July 4, 1972

[54] APPARATUS FOR PROVIDING A CUTTING TOOL WITH A CUTTING PORTION OF A METAL HARDER THAN A BASE METAL OF THE CUTTING TOOL WHICH CARRIES THE CUTTING PORTION

[72] Inventors: Otto Stier; Heinz Kuhn; Udo Vollmer, all of Biberach, Riss, Germany

[73] Assignee: Vollmer Werke Maschinenfabrik GmbH, Biberach/Riss, Germany

[22] Filed: April 29, 1968

[21] Appl. No.: 725,236

[30] Foreign Application Priority Data

April 27, 1967 Germany..............................V 33542
June 15, 1967 Germany..............................V 33870

[52] U.S. Cl..............................164/251, 164/80, 164/138, 164/92, 164/105, 164/106, 76/112, 76/28, 164/334, 249/78, 249/91
[51] Int. Cl..............................................B22d 27/02
[58] Field of Search..............164/80, 332, 92, 251, 334, 164/120, 103, 275, 284, 303, 319, 320, 321, 54, 56, 49, 48, 250, 112, 312, 315, 333, 334, 105, 106; 76/28, 29, 112; 249/78, 91, 93, 95, 90; 18/16 H, DIG. 35, 17 R, 16 R, 36, 17

[56] References Cited

UNITED STATES PATENTS

| | | | |
|---|---|---|---|
| 1,065,306 | 6/1913 | Eshleman | 164/334 |
| 1,800,370 | 4/1931 | Arkema et al. | 249/93 X |
| 2,542,503 | 2/1951 | Galloway | 164/251 |
| 2,688,168 | 9/1954 | Hurt | 164/120 X |
| 3,036,310 | 11/1962 | Connoy | 76/112 |
| 2,250,561 | 7/1941 | Wissler | 164/103 X |
| 1,910,884 | 5/1933 | Comstock | 164/80 X |
| 2,554,499 | 5/1951 | Poulter | 164/320 X |
| 1,961,621 | 6/1934 | Northrup | 164/51 X |
| 777,338 | 12/1904 | Forbes | 164/49 |
| 2,437,127 | 3/1948 | Richardson | 219/3 |
| 2,330,762 | 9/1943 | Tooker | 18/17 R |
| 2,582,922 | 1/1952 | Crowley et al. | 164/333 X |
| 2,256,769 | 9/1941 | Amrine | 164/303 X |
| 2,358,090 | 9/1944 | Longoria | 164/50 |
| 1,559,884 | 11/1925 | Kasch | 18/17 R |
| 1,126,953 | 2/1915 | Burroughs et al. | 18/17 |
| 2,297,491 | 9/1942 | Meier, Jr. | 164/50 |

FOREIGN PATENTS OR APPLICATIONS

| 215,522 | 3/1923 | Great Britain | 164/250 |
|---|---|---|---|
| 217,288 | 4/1942 | Switzerland | 164/312 |
| 153,465 | 5/1938 | Austria | 164/312 |

*Primary Examiner*—J. Spencer Overholser
*Assistant Examiner*—V. K. Rising
*Attorney*—Curt M. Avery, Arthur E. Wilfond, Herbert L. Lerner and Daniel J. Tick

[57] ABSTRACT

A method and apparatus for providing a cutting tool with a cutting portion of a metal harder than the base metal of the cutting tool which carries the cutting portion. The part of the base metal of the tool which is to carry the harder cutting portion is situated in a mold means made up of at least a pair of mold components movable toward and away from each other, and the harder metal initially is in the form of a powder which while it is in the mold means in engagement with the softer base metal is heated with the softer metal to an extent sufficient to cause the particles of the harder metal to melt and fuse to each other and to cause the harder metal to form an intimate bond with the softer metal, a suitable heating means being provided for this purpose to coact with the mold means. After the metal in the mold sets the mold components are moved apart from each other.

6 Claims, 7 Drawing Figures

INVENTORS:
Otto Stier,
Heinz Kuhn,
Udo Vollmer.

APPARATUS FOR PROVIDING A CUTTING TOOL WITH A CUTTING PORTION OF A METAL HARDER THAN A BASE METAL OF THE CUTTING TOOL WHICH CARRIES THE CUTTING PORTION

Our invention relates to a method and apparatus for providing a cutting tool with a cutting portion of a metal harder than the base metal of the cutting tool which carries the cutting portion thereof.

It is already known to solder onto the softer base metal of a cutting tool a harder cutting metal. However, this known principle has a disadvantage in that the solder connection can only provide a reliable bond between the harder and softer metals when the harder metal cutting portion is distributed over a relatively large surface area of the softer base metal and when the cutting tool itself has only a small extent of flexibility. In the event that the harder metal cutting portion is situated on a relatively small area of the softer base metal and the flexibility of the cutting tool is relatively great, as is the case in saw blades, for example, where hard metal cutting portions are situated on relatively small tooth tip portions of the saw teeth, the harder metal cutting portions are sprung from the softer base metal and the tool can no longer be used.

There is a known method for providing the teeth of a saw blade with cutting portions harder than the tip portions of the teeth which carry the cutting portions, according to which the harder cutting portions are joined to the softer tip portions of the saw teeth by being welded thereto in a conventional manner according to which the harder metal in rod form is welded to the tip portion of the saw tooth in a flame of an autogenous burner. However, this known method has the disadvantage of being capable of providing on the tip portion of each saw tooth only a lump of harder metal which in its cold state has a haphazard configuration. As a result it becomes necessary subsequent to the welding of such metal onto to each saw tooth to grind the harder metal according to a grinding process which is extremely protracted, time-consuming, and costly, in order to achieve for the harder metal the desired configuration for the cutting portion of each saw tooth.

For the sake of completeness it should also be noted in this connection that it is already known to spray a metal powder onto the exterior surface of the base metal and then to heat this metal powder in a flame in such a way that the individual particles of the metal powder become sintered together and form an exterior coating which is harder than the base metal. However, inasmuch as it is possible in this way to achieve only relatively thin uniform coatings from the harder sintered metal, this method is hardly suited for situating at the cutting region of a cutting tool a cutting metal which is harder than the base metal of the tool which carries the cutting metal. If, for example, this known method were to be used for manufacturing the cutting portions of the cutting teeth of a saw blade, the front and side surfaces of the tip portion of each tooth of the saw would be provided with a uniform coating of the harder metal without achieving the desired configuration of the cutting portion of each tooth.

Therefore, in this case also in order to achieve the desired configuration of the cutting portion a subsequent costly and time-consuming cutting process is required, and aside from the great hardness of the sintered metal powder, there is the additional difficulty that the sintered metal powder is present only in the form of a thin layer, so that an extremely careful grinding must be carried out in order not to grind away from the base metal the coating of harder metal throughout the entire thickness of the latter. For these reasons the spraying or sprinkling of metal powder with subsequent sintering thereof has not been used for the manufacture of cutting portions of cutting tools. This latter method has in fact only been used to any appreciable extent primarily for the manufacture of protective coatings on a base metal whose exterior surface is to be protected.

It is accordingly a primary object of our invention to provide a method and apparatus for manufacturing a cutting tool with a cutting portion of a metal which is harder than the base metal of the tool which carries the cutting portion thereof.

In particular, it is an object of our invention to provide a method and apparatus of this type which does not require any expensive, time-consuming and costly grinding of the harder metal after it is joined to the softer metal.

Also, it is an object of our invention to provide a method and apparatus for reliably bonding the harder cutting metal to the softer base metal even in the case where only a relatively small area of the base metal carries the cutting metal and also even in the case where the cutting tool is springy and flexible, as is the situation encountered in saw blades.

According to one of the methods of our invention, for achieving the above objects, the softer base metal is situated at its portion which is to carry the harder cutting metal in the hollow interior of a mold which determines the configuration of the cutting portion. The hollow interior of the mold is at least partly filled with the harder metal in powder form, and then the harder metal powder together with the softer base metal are heated in the mold to such an extent that the particles of harder metal powder become molten and not only become bonded to each other but also form an intimate bond with the softer base metal. The thus heated harder metal is maintained in the mold until it sets therein, and then the mold is removed so as to expose the substantially rigid harder metal which forms the cutting portion of the tool.

With the method of our invention there is the advantage that the harder metal which initially is in powder form melts together with the softer base metal at the portion thereof which is to carry the cutting portion upon heating of the harder metal until it assumes a molten condition, so that in its cold condition the harder metal which forms the cutting portion has an extremely secure connection with the base metal so that even in the case of elastic cutting tools, as in the case of saws, for example, the cutting metal cannot be sprung from the base metal.

Furthermore, our invention achieves the advantage of giving to the harder metal in its cold, set condition, the desired configuration of the cutting portion of the tool, so that only an extremely simple grinding of short duration is required in the event that it becomes necessary to grind away any burrs which may be present.

According to another method of our invention, which is also capable of fulfilling the above objects, the softer base metal which is in the mold is initially heated together with the mold itself before the latter is supplied with the harder metal, so that subsequently the harder metal is supplied in powder form into the heated mold to become molten therein and to form an intimate bond with the heated softer metal which is within the mold. Then the harder molten metal in the mold is maintained therein until it sets and assumes a rigid condition, as was the case with the above-described method of our invention, and after the mold is removed the harder metal forms the cutting portion of the tool.

Thus, with this second method of our invention, in contrast to the first method described above, after the softer base metal portion of the tool is situated in the mold, this mold is not initially filled with the harder metal in powder form and in cold condition and then heated. Instead, while the mold is still in its unfilled condition it is itself heated together with the base metal therein and only then is the harder metal in powder form introduced into the mold to melt therein. This second method provides the advantage of greatly reducing temperature fluctuations to which the mold is subjected with the first method of our invention as described above, so that with the second method the mold itself will have a longer operating life. Furthermore, this second method of our invention brings about a certain saving of time in the operations, since with this second method a shorter period of time is required for bringing the harder metal into its molten condition than with the first method of our invention described above.

Also, with this second method of our invention, if there are any inaccuracies between the mold and the limiting surface areas of the softer base metal to which the harder metal is to be bonded, it is not possible for even relatively small amounts of the harder metal in powder form to become situated beyond the interior of the mold since the harder metal when introduced into the mold which has previously been heated immediately melts therein.

In order, with the above methods of our invention, to avoid formation of cavities in the body of the harder metal and to guarantee that the harder metal in its molten condition completely fills the entire cross sectional area of the mold, even in the regions of corners thereof, a pressure is exerted on the harder metal after the melting thereof in the mold, and this pressure is maintained until the harder metal becomes rigid.

There is a third method according to our invention for bonding on a predetermined surface area of a softer base metal of the tool a harder metal which will form a cutting portion of the tool. This third method involves directing into the interior of the mold a flame which engages the softer base metal which has previously been properly situated in the mold so that in this way the softer base metal in the mold is heated directly at the area thereof to which the harder metal is to be bonded. Then the harder metal in powder form is introduced into the mold along a path which extends in the interior of the flame itself so that the harder metal is melted in the flame itself. The harder metal is introduced into the mold in this way, along the interior of the flame, until there is an intimate bond between the harder metal and the softer base metal and until the mold has been filled to the required extent. Then the flame is turned off and the harder metal is brought into its cold condition in which the harder metal forms the cutting portion of the tool after the mold is removed.

Thus, with this third method of our invention, the harder metal in powder form, is not filled into the mold and heated in the latter, as was the case with our other methods described above. Instead with this third method of our invention the harder metal in powder form is directed along the interior of the heating flame before reaching the interior of the mold so that the harder metal is already in molten condition when it becomes deposited on the softer metal, and it is in this way that the mold becomes filled to the required extent with the harder metal.

This third method of our invention is particularly suited for a situation where the mold is only sufficiently great to enable the cone-shaped flame of the burner to completely fill the interior of the mold. Thus, in this case, during the entire duration of the method, the position of the flame need not be changed in any material manner, since the surface area of the softer base metal to which the harder metal is to be bonded is completely enveloped within the flame and thus is uniformly heated throughout its entire surface area, while the harder metal in powder form moves along the interior of the flame to substantially fill out the interior hollow space determined by the configuration of the mold. In this way the harder metal continuously builds in a gradual manner within the mold until the harder metal has accumulated in the mold to the desired extent.

The opening in the wall of the mold through which the flame is introduced can be situated opposite the surface area of the softer base metal to which the harder metal is to be bonded in the case where this area of the softer base metal is situated only in a single plane, so that in this way the flame which extends through the opening of the mold wall will accurately engage the surface area of the soft metal in the mold which is to receive the harder metal and the particles of the harder metal in powder form can be sprayed in molten condition onto this surface area of the soft metal.

On the other hand, if the interior space of the mold and the surface area of the softer base metal to which the harder metal is to be bonded are so great that the flame directed into the mold cannot fill out the entire inner space thereof and does not completely cover the surface area of the softer base metal in the mold, then in order to fill the mold with the harder metal to the required extent our method is carried out in such a way that initially, assuming that the particular surface area of the softer metal is rectangular in configuration, a corner region of this surface area is heated by the flame and then this corner region has the harder metal spray thereon with flowing of the harder metal in powder form through the flame itself to be in molten condition when reaching the softer base metal. When the deposit of harder metal on this corner region has reached a predetermined thickness, the cone-shaped flame of the burner is moved along a side edge region of the rectangular area while the feeding of the harder metal in powder form is continued so that in this way the harder metal is deposited at an area which adjoins the initially treated corner region, and in this way this second region which has been preheated as a result of the previous spraying of the corner region is itself sprayed with the molten particles of harder metal. After this latter deposition of harder metal is terminated, the flame is moved further along a side edge of the rectangular area so as to repeat these steps, and in this way a next portion of the surface area of the softer base metal has the harder metal deposited thereon. This method is continued until the opposite side edge of the rectangular area is reached. Then, while the feeding of the harder metal in powder form is still continued, the cone of flame is directed along this second side edge of the rectangle through a given increment and then moved in a stepwise manner back to the first side edge of the rectangular area. When the cone of flame during the continuous feeding of the harder metal in powder form has again reached the opposite side edge of the rectangular area, the cone of flame is again moved through a predetermined increment along this second side edge and is again directed step by step toward the first side edge of the rectangular area. This method is continued until the entire surface area of the softer base metal is covered with a layer of the harder metal of predetermined thickness. In the event that this latter layer does not yet have the desired thickness, the same back and forth movement of the flame is repeated to deposit on the first layer one or more additional layers until the interior of the mold has been filled with the harder metal to the required extent.

In order to guarantee that the harder metal when it completely fills the mold forms a completely smooth exterior surface closing the mold opening through which the flame is directed and flush with the edge of this opening, the flame of the burner, which of course must be hot enough to introduce the harder metal in molten condition, is at this time, while the feeding of the harder metal in powder form is continued, situated at different angles one after the other at the opening of the mold, so that any unevenness in the harder metal in the region of the mold opening at the exterior surface of the harder metal is completely smoothed out and the harder metal is in this way provided with an exterior flat surface extending to the edge of the mold opening and flush therewith.

In order to provide the required flame, different types of burners can be used. However, it is preferred to use for this third method of our invention an autogenous burner whose burner nozzle is directed toward the opening of the mold so as if to introduce the burner flame into the interior of the mold, and the mold burner assembly is itself provided with a supply container for the harder metal in powder form. This supply container is situated on a part of the burner housing and has a discharge opening which can be controlled by a valve and which directs the harder metal in powder form into the stream of the gas mixture which flows through the burner nozzle to form the flame. In this way the powdered harder metal is introduced directly into the combustible gas stream to be carried along with the latter, so that the powdered harder metal will flow through the interior of the flame itself into the interior of the mold.

The harder metal in powder form can, in accordance with our invention, have the most widely varying compositions. It is only required that the harder metal in powder form can become molten and that the particles of powder which become sintered together in their molten condition undergo a molten bond with the heated surface area of the softer base metal of the tool, so that when the harder metal cools to assume its cold condition it will have an intimate bond at the required location with the softer metal. Of course, it is also required that the metal powder be selected so that when it assumes its cold condition after being in its molten condition it will indeed be harder than the base metal. A metal powder of this type can have a composition selected from among widely different alloys having, for example, a chrome basis, a nickel basis, a cobalt basis, or a copper basis, where the melting point of the composition of powdered metal is approximately in the region of 1,400° C.

Our invention is illustrated by way of example in the accompanying drawings which form part of our application and in which.

Figure 2:
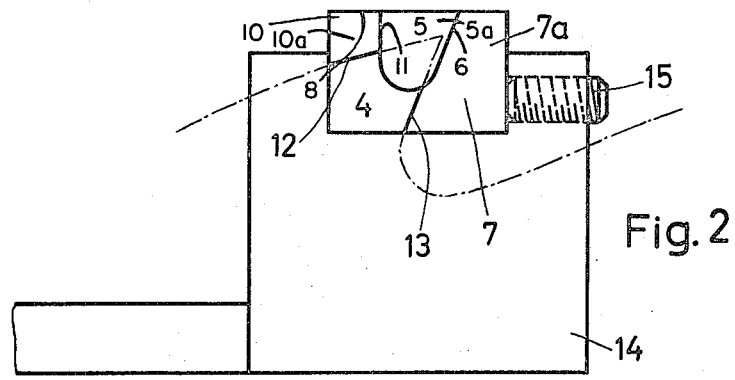
FIG. 2 shows in a side elevation and in a schematic manner one of the mold components and the carrier therefor, with the tip portion of the tooth of a saw indicated in FIG. 2 at its position with respect to the mold interior.
Figure 4A:
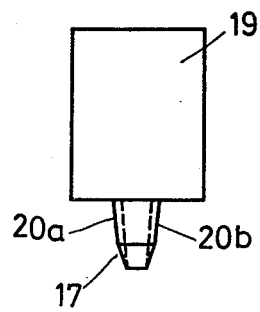
Figure 4B:
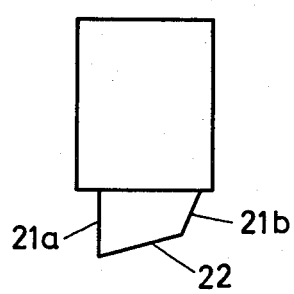
Figure 4C:
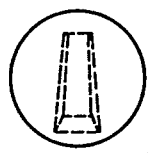
Figure 5:
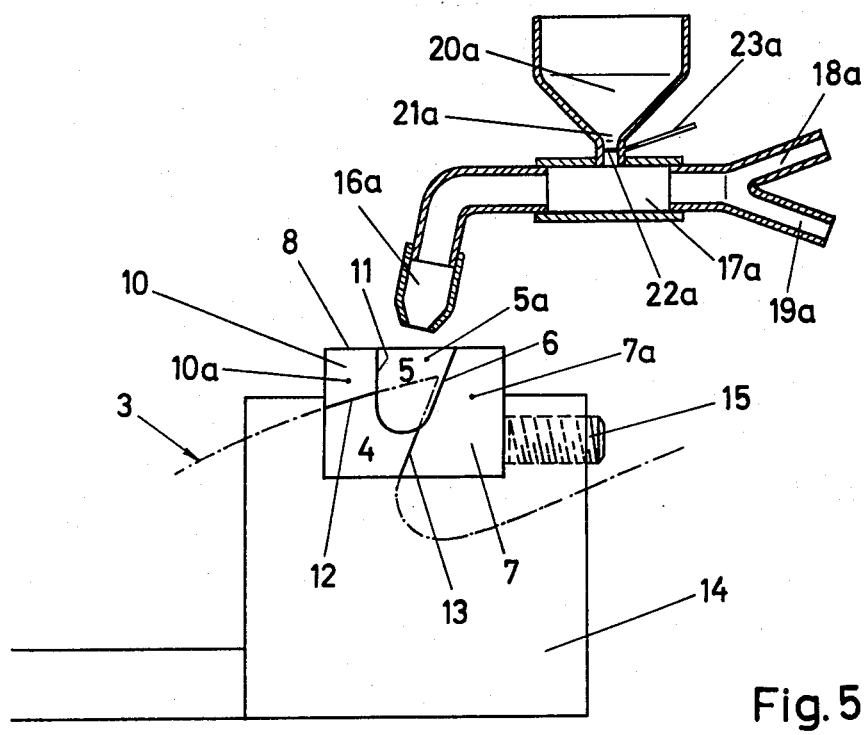

FIGS. 4a, 4b and 4c are respectively schematic front, side, and top plan views of a plunger of our invention which is used to close the filling opening of the mold; and FIG. 5 shows the mold structure of FIG. 2 in association with a sectional schematic illustration of an autogenous burner which is shown in its operative position with respect to the mold and by means of which the above-described third method of our invention is carried out.

Figure 1:
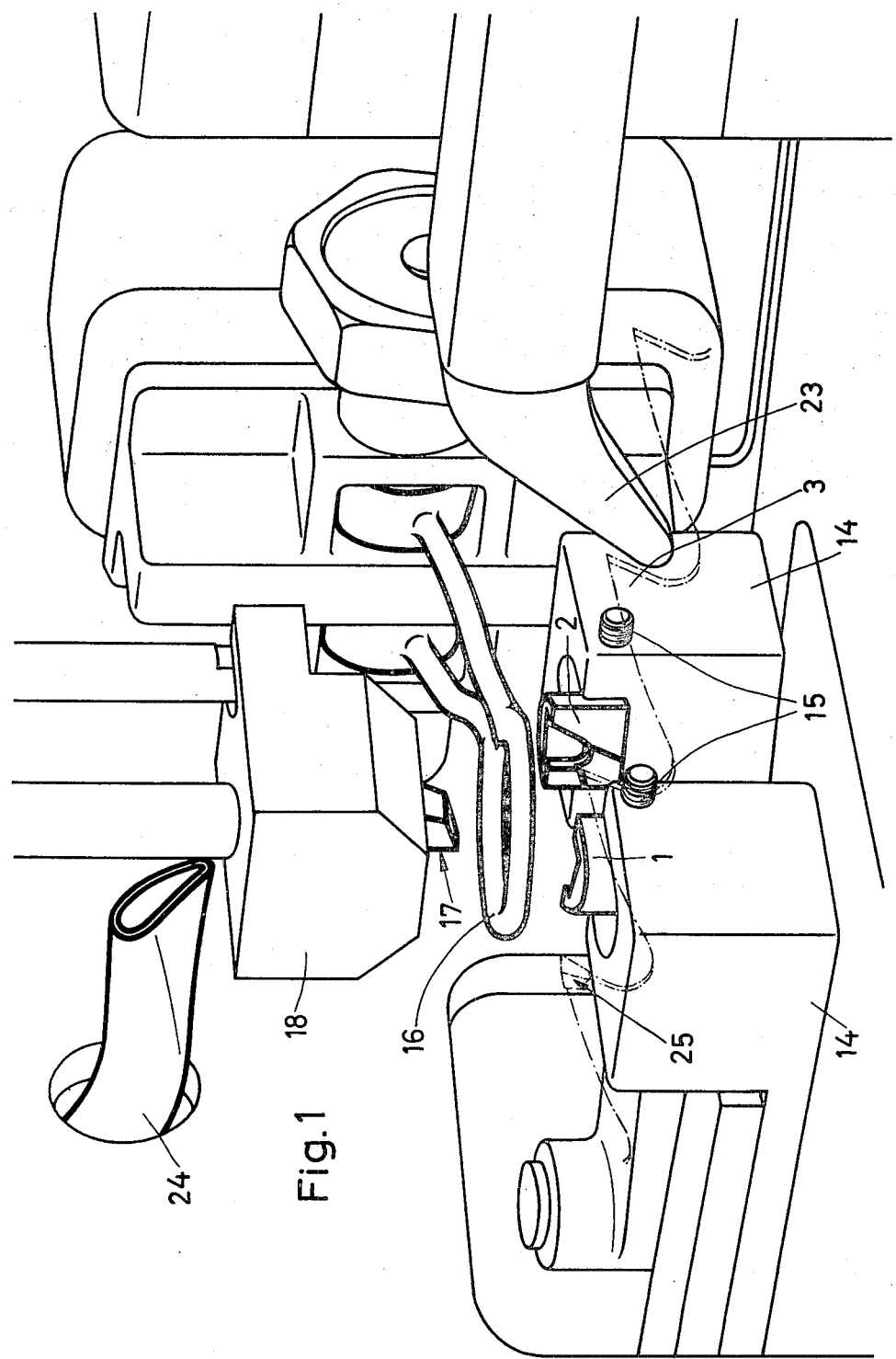
FIG. 1 is a schematic perspective illustration of one possible apparatus of our invention, this apparatus of FIG. 1 being adapted to carry out the first and second methods referred to above.

Referring now to FIG. 1, the structure of our invention which is illustrated therein is capable of depositing, in the illustrated example, cutting portions of a plurality of sawteeth on the tip portions of the softer base metal of the sawteeth. The mold means includes a pair of the mold components 1 and 2 adapted to successively engage each tooth at its tip portion and at opposite side surfaces of each tooth with the hollow interior of the mold means forming a space in which a predetermined front edge portion of the sawtooth is situated. The pair of mold components 1 and 2 are mirror images of each other but are otherwise identical and they are situated on opposite sides of the saw blade which is to be treated and which is shown in FIG. 1 in dot-dash lines, some of the teeth of the saw blade 3 being indicated in FIG. 1.

As may be seen from FIG. 2, each mold component is provided with a side surface portion 4 for engaging a side surface of the sawtooth whose tip portion is situated in the interior of the mold. Each side surface portion 4 of each mold component is formed with a depression 5, and these depressions of the mold components will determine the configuration of the harder metal which will form the cutting portion of each tooth and which will be intimately bonded to the base metal formed by the tip portion of each tooth which is initially situated in the mold. Each depression 5 has a base surface portion 5a which is directed toward the saw blade and which is inclined in such a way that in the cutting direction of the tooth, from left to right, as viewed in FIGS. 2 and 3, the base surface 5a is inclined away from the saw blade while in the vertical direction the base surface 5a is downwardly inclined inwardly toward the saw blade. At its front region which is near the front edge of each tooth each depression 5 terminates in a front edge portion 6 which projects upwardly and forwardly from the front edge of the tip portion of the sawtooth from a given elevation of the front edge of the latter in accordance with the required thickness of the cutting portion which is to be bonded to the tip portion of the sawtooth, this edge 6 being inclined upwardly and forwardly also in the cutting direction of the saw. Each forward edge 6 of each depression 5 intersects a projection 7 which extends inwardly from the surface 4, which engages the exterior side surface of the sawtooth, which has a thickness approximately equal to half the thickness of the sawtooth, and which is provided with an exterior surface 7a extending parallel to the plane of the saw blade and engaging the corresponding surface 7a of the other component of the mold.

As may be seen from FIG. 2, the mold components when engaging the saw blade extend over the back edge of the sawtooth and upwardly from the latter. The depressions 5 terminate at their top ends in the outer top surface 8 of the mold and at this top surface the depressions 5 define the filling opening 9 through which the mold is filled, as is apparent from FIG. 3.

Moreover, each mold component has, as viewed in the cutting direction of the saw, a rear upper end region 10 which projects over the rear edge of the sawtooth through half the thickness thereof and which of course also projects inwardly beyond the surface 4 which engages the side surface of the sawtooth, and the rear projection 10 of each mold component terminates in a front substantially vertical edge 11 defining the rear portion of the depression 5. The downwardly directed edge 12 of each projection 10 of each mold component has an inclination corresponding to the rear edge of the sawtooth and lies flush against the rear edge of the sawtooth with the position of the parts indicated in FIG. 2. Furthermore, the projection 7 terminates at its lower rear portion where it adjoins the surface 4 of each mold component, in an inwardly directed inclined edge 13 which is also of the same inclination as and lies flush against the front edge of each sawtooth up to the elevation where the harder metal will begin. Thus, this edge 13 of each projection 7 forms a continuation of the edge 6 of each depression 5 with the edge 13 lying flush against and extending along the front edge of the sawtooth which will adjoin the harder cutting metal portion bonded thereto. Thus, the edges 12 and 13 of the projections 10 and 7, respectively, determine the accurate positioning of the mold components with respect to the sawtooth portion which is situated in the mold.

Figure 3:
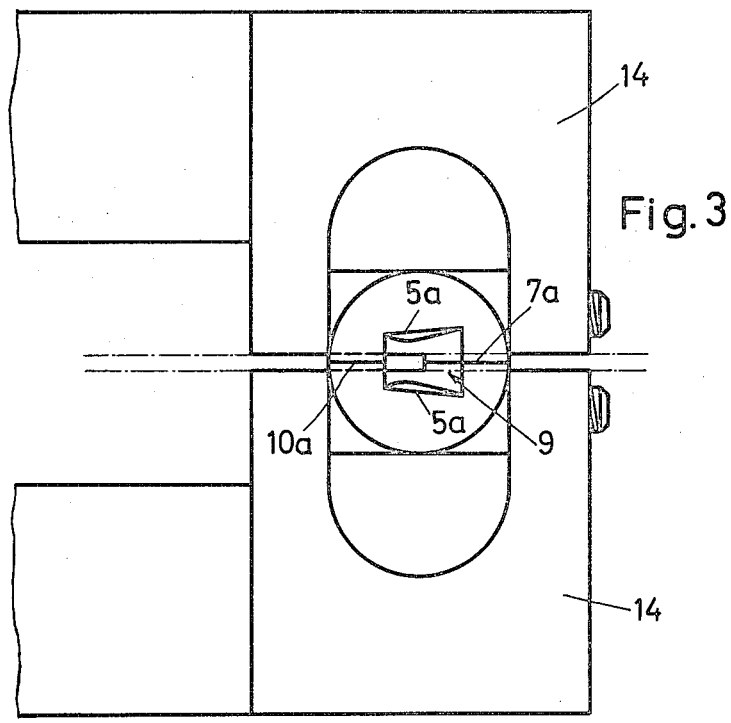
FIG. 3 is a plan view schematically illustrating the pair of mold components and carriers therefor, with these mold components shown engaging the opposed side surfaces of a sawtooth.

As was the case with the forward projection 7, the rear projection 10 of each mold component also has an exterior flat surface 10a situated in the plane of the saw blade and engaging the corresponding flat surface area 10a of the projection 10 of the other mold component, the pair of mold components being shown engaging each other at their surfaces 7a and 10a in FIG. 3.

As is particularly apparent from FIG. 1, both of the mold components 1 and 2 are fixed to carriers 14 by way of set screws 15 or the like, these carriers 14 being in the form of suitable blocks fixed to and situated at the ends of a pair of swing-levers so that these blocks or carriers 14 and the mold components respectively carried thereby are movable toward and away from each other in directions extending transversely with respect to the saw blade. Thus, the components 14, 15 and the swing levers form a moving means for carrying the mold components and moving them toward and away from each other transversely from the saw blade. In this way when the sawtooth which is to be treated is situated between the mold components, the latter can be displaced toward each other into engagement with the sawtooth in the manner described above, and the mold components are then maintained in their operative position in any suitable way. After the molten harder metal sets in the mold to an extent sufficient to become solid, the pair of mold components can be moved apart from each other by this moving means, so that in this way the molded harder metal is released from the mold.

The structure of our invention also includes a heating means, and in the example of FIG. 1 the heating means takes the form of a high-frequency loop 16 which can be connected to a source of high frequency potential with this loop 16 being situated, in the position of the part shown in FIG. 1, above the mold components. When the mold components 1 and 2 are in their operative positions with respect to each other engaging each other and the sawtooth, the high frequency loop 16 is lowered to an operating position where it is spaced from but surrounds the mold components and the sawtooth portion situated therein so as to heat the mold and the softer base metal therein.

Furthermore, the structure of our invention includes a plunger 17 movable up and down in a vertical direction and carried by a plunger-holder 18. This plunger 17 forms a closure for closing the filling opening of the mold which is formed by the upper portions of the depressions 5 of the mold components, respectively. Referring to FIGS. 4a – 4c, it will be seen that the plunger 17 of our invention is situated at the lower end of a cylindrical component 19 by means of which the plunger 17 is fixed to the plunger-holder 18. The plunger 17 itself has a rectangular cross section and is provided with four side edges 20a, 20b, as well as 21a and 21b. In addition to these side edges, or side surfaces, the plunger has a bottom edge or face 22. A pair of opposed surfaces 20a and 20b of the plunger 17 are downwardly inclined in correspondence with the downward inclination of the base surfaces 5a of the depressions 5, these surfaces 20a and 20b being inclined toward each other in a direction extending downwardly from the cylindrical component 19. In addition, the side surfaces 20a and 20b are inclined in such a way that they are laterally inclined toward each other in a direction from the end surface 21b toward the end surface 21a, so that this end surface 21a is narrower than the end surface 21b.

The end surface 21a of the plunger 17 extends along the corresponding edge regions 11 of the depressions 5 of the components 1 and 2, in a vertical direction, while the opposed end surface 21b of the plunger 17 has an inclination corresponding to the front edge portions 6 of the pair of depressions 5. The lower face 22 of the plunger 17 is inclined in correspondence with the inclination of the rear edge of the sawtooth, so that this face 22 will in fact form a continuation of the downwardly directed edges 12 of the projections 10.

By reason of this configuration of the plunger 17 of our invention, it is possible to introduce it into the filling opening of the mold in such a way that the lower edge or face 22 of the plunger lies against the rear edge portion of the sawtooth part which is to receive the harder cutting metal, while the opposed side surfaces 20a and 20b engage the upper regions of the base surfaces 5a of the depressions 5, respectively. The other surfaces, namely the opposed end surfaces 21a and 21b respectively engage and extend along the edge regions 11 and 6 of the depressions 5.

In order to situate the individual sawteeth of the saw blade one after the other between the pair of mold components while the latter are separated from each other, a shifting pawl 23 is provided, as schematically indicated in FIG. 1. This shifting or work-feeding pawl 23 is movable back and forth in the plane of the saw blade through such an increment that when it is displaced toward the mold it engages the front edge of a tooth to displace the saw blade in a direction opposite to its cutting direction so as to situate in this way the next tooth which is to be treated in between the mold components 1 and 2. During its movement in the cutting direction of the saw blade the feeding pawl 23 rides over the rear edge of the next-following tooth to fall in front of the latter in preparation for the next feeding stroke.

The structure of our invention further includes, in the example of FIG. 1, a supply means for supplying a metered amount of the harder material in powder form into the interior of the mold, and this supply means includes the supply tube 24 through which the harder metal in powder form is introduced into the interior of the mold to engage the sawtooth portion therein.

The structure shown in FIG. 1 operates in the following manner to carry out the first of the methods of our invention referred to above.

With the structure in the position shown in FIG. 1 where the mold components 1 and 2 are separated from each other while the high-frequency loop 16 is in its upper inoperative end position and the plunger 17 is situated above the loop 16 in the retracted end position of the plunger 17, the saw blade 3 is advanced by the feed pawl 23 in a direction opposite to the cutting direction by an increment equal to the distance of one tooth so that the next sawtooth which is to be treated is precisely situated at its proper position between the pair of mold components 1 and 2. Then the feed pawl 23 is retracted in the manner described above so that it engages the front edge of the next sawtooth. Now the mold components 1 and 2 are moved by the moving means which includes the carriers 14 toward each other until the mold components engage the opposed side surfaces of the tooth. Then the high-frequency loop 16 is lowered to its operating position so that the mold 1, 2 and the part of the sawtooth therein is surrounded and spaced from the heating means 16. Now the supply means 24 is actuated to introduce into the mold a metered amount of harder metal in powder form, this amount being accurately measured and introduced through the filling opening of the mold so that the metal powder fills the space between the tip portion of the sawtooth which is in the interior of the mold and the surfaces which define the depressions 5, the powdered metal thus being situated in the space between the front edge of the sawtooth and the edge 6 of the mold as well as in the space between the side surfaces of the sawtooth and the base surfaces 5a of the depressions 5.

With the mold thus provided with an accurately metered amount of harder metal in powder form, the heating means 16 is connected into a suitable high-frequency circuit so that the harder metal powder becomes molten within the mold means 1, 2 of our invention. Then the plunger 17 is lowered into the filling opening to a depth sufficient to place the lower end surface 22 of the plunger in engagement with the rear edge of the base metal of the tooth portion in the mold while at the same time exerting a certain pressure on the material in the mold. Then the high-frequency circuit is opened and during or after the cooling of the molten harder metal in the mold the plunger 17 is retracted to its upper rest position. Now the high-frequency loop 16 is returned to its upper end position, and the mold components 1 and 2 are separated from each other so that the feed pawl 23 can displace the next tooth into the proper position between the mold components. FIG. 1 shows in dot-dash lines a sawtooth which has already been provided with a harder metal cutting portion 25 according to the invention.

In order to be able to carry out the above-described operations in an automatic manner and in proper sequence, the apparatus of our invention can be operatively connected with a suitable sequential control arrangement which will automatically control the structure so as to bring about the above operations in the required sequence and for the required durations.

In order to carry out the above-described second method of our invention, all of the above operations of the structure of FIG. 1 take place in the same way until the lowering of high-frequency loop 16. However, with the second method of our invention, after the high-frequency loop 16 is lowered to its operating position, the supply means 24 is not actuated to deposit the needed amount of harder metal in powder form into the mold. Instead the high-frequency loop 16 is connected into the electrical circuit which is connected to the required source of electrical energy so that with this second method the mold together with the portion of the softer base metal of the tool in the mold are heated to the required temperature. It is only then that the supply means 24 is actuated to introduce the precisely needed amount of harder metal in powder form. Now the harder metal in powder form which is introduced into the interior of the mold melts therein as a result of the elevated temperature of the mold brought about by the high-frequency loop 16 of the heating means, and in this way an intimate bond of the preheated softer base metal with the harder metal is achieved. Then, as was the case with the first method described above, the plunger 17 is lowered into the filling opening of the mold, the high-frequency source of energy is turned off, and during or after cooling of the harder metal the plunger 17 is retracted to its rest position. After the high-frequency loop 16 is retracted to its upper rest position, the pair of mold components 1 and 2 are separated from each other and the feeding pawl 23 is actuated to bring the next tooth into the position to be treated with the apparatus and method of the invention.

As is apparent from the above description of the third method of our invention, it is possible with the described structure, and with the omission of the high-frequency loop 16, the supply means 24, and the plunger 17, to carry out the method of our invention. For this purpose, as shown in FIG. 5, there is an autogenous burner which is provided with the burner nozzle 16a as well as with a mixing chamber 17a which communicates at its inlet end with the pair of supply conduits 18a and 19a through which oxygen and a combustible material such as acetylene or hydrogen are fed to the burner. At the discharge end of the mixing chamber 17a a connection is made with the burner nozzle 16a. The mixing chamber 17a of the burner or heating means of FIG. 5 is operatively connected with a supply container 20a in which the harder metal in powder form is situated. The lower funnel-shaped outlet 21a of the container 20a communicates with the interior of the mixing chamber 17a through a swingable closure valve plate 22a provided with an operating handle 23a for selectively situating the closure 22a in its open or closed position.

In order to provide with this construction of FIG. 5 a cutting portion for a sawtooth where this cutting portion is made of the harder metal in powder form, the softer base metal of the sawtooth which is in the interior of the mold is initially situated in the mold between the components 1 and 2 thereof upon movement of the carriers 14 toward each other, in the manner described above, in connection with FIGS. 1–3. Thus, with the mold components separated from each other the tooth which is to be treated is situated precisely between the mold components and then the carriers 14 of the moving means are displaced toward each other so that the mold components 1 and 2 have their inner side surface portions 4 engaging the exterior side surfaces of the sawtooth which is to be treated. Then the burner of FIG. 5 is brought into the operating position shown in FIG. 5 where it is situated over the mold, and with the valve 22a in its closed position a cone-shaped flame is directed through the opening 9 into the interior of the mold so that the tip portion of the sawtooth which is exposed in the interior of the mold is heated at its front and side surface regions, and of course at the same time the mold itself is heated. Then, the lever 23a is actuated to displace the valve 22a either to a partly or fully open position, so that the harder metal in powder form can flow out of the supply container 20a, which forms the supply means of this embodiment, into the mixing chamber 17a. In the mixing chamber 17a the powdered material is suspended in the gas stream and is carried thereby to the nozzle 16a to be directed together with the flame into the interior of the mold where the powdered metal engages the softer sawtooth portion in a molten condition. In this way there is a gradual filling of molten harder metal in the interior of the mold along the front edge and side surface regions of the tip portion of the sawtooth therein. Molten particles of the harder metal which during the filling of the mold engage the rear surface of the sawtooth drop from this rear surface downwardly or are directed downwardly by the pressure of the flame, so that even these particles which initially engage the rear edge of the sawtooth serve to fill the space within the mold which surrounds the opposite side surface and front edge of this portion of the sawtooth. The delivery of the powdered harder metal into the flame is maintained until the molten harder metal has reached in the mold the elevation of the top end of the front edge of the tooth, at which time the cutting portion of the tool will have the required configuration projecting somewhat forwardly beyond the front edge of the tooth. At this time the valve 22a is moved by actuation of the lever 23a back into its closed position, and the molten harder metal in the mold is brought into its cold condition by removing the flame. Finally the carriers 14 of the moving means are moved apart from each other to separate the mold components 1 and 2, whereupon the next sawtooth portion which is to be treated is displaced to a location between the mold components 1 and 2. Then the above steps of this third method of our invention are repeated.

Thus, the apparatus for carrying out the methods of our invention includes at least a pair of mold components which form the mold of our invention and which are actuated by a moving means so as to be separated from each other after the hardened metal has solidified in the mold by setting and cooling therein. By reason of the fact that the preferred construction of the mold of our invention includes only a pair of mold components, it is possible to remove the mold from the hardened metal in an extremely convenient manner requiring only that the mold components be moved apart from each other. Therefore, it is not necessary to damage or otherwise destroy either part or all of the mold of our invention in order to release the molded metal therefrom.

The plunger 17 of our invention not only provides a closure for the mold but in addition exerts a pressure on the harder material on the mold, this pressure being maitained until the harder metal becomes substantially rigid. Preferably the harder metal in powder form is filled into the mold in such an amount that this latter material will in its molten condition have an elevation somewhat higher than the elevation of the lower end face 22 of the plunger 17 when the latter is at its lower operating position within the mold, so that when subsequently this plunger is indeed introduced into the mold it will exert a pressure in the plane of its lower end face 22 on the molten metal to fill the space within the mold beneath the plunger in a complete and cavity-free manner.

In order to be able to introduce the plunger easily into the filling opening of the mold as well as to remove it easily from the mold, the above-described tapered configurations of the mold and the plunger are provided.

As was pointed out above, the heating means of our invention can take the form of the high frequency loop 16. In this case, however, since the harder metal is powdered condition in the interior of the mold is a poor conductor of electricity, the mold itself must be made of a metal of good electrical conductivity so that the mold will be heated by eddy currents which flow within the mold walls so as to bring about melting of the harder metal. The construction is such that the eddy currents will also become situated in the softer base metal of the tool which is situated in the interior of the mold so that this softer base metal is also heated by the eddy currents.

As an alternative, however, it is possible for the heating of the base metal of the tool portion in the interior of the mold to take place through the mold itself.

Of course, it is also possible to provide heating of the mold and the softer base metal of the tool therein through the above-described autogenous burner shown in FIG. 5, and in this case the mold need not be made of an electrically conductive material.

However, the mold of our invention should be capable of withstanding at least a temperature of up to approximately 3,000° C., the mold should be non-oxidizing, and in addition it should be made of a material which has a relatively small coefficient of thermal expansion and which will not cling to the molten metal within the mold and to the solidified harder metal which solidifies upon cooling in the mold, so that in this way the harder metal in powdered condition can be melted within the mold with the mold components being easily removable from the hardened, cooled metal without providing in any way upon heating of the mold any changes in the final configuration of the cutting portion.

Preferably the mold of our invention is made of graphite provided with a coating of a material selected from the group consisting of titanium, silicide, boronitride, zirconium oxide, or silicon carbide. Coatings of any one of these latter materials serve the purpose of protecting the graphite from the heat of the heating means.

The use of graphite has the advantage of making the mold material electrically conductive so that the heating means can include a high-frequency loop as described above. In this case it is also possible, however, to heat the mold in the manner of an electrical resistance heater, by providing a source of electrical current whose circuit is closed through the electrically conductive mold which itself is made of graphite.

In order to guarantee that during the mass production of cutting portions of cutting tools there will always be the same amount of harder metal in powdered condition introduced into the mold, it is preferred to use a metered supply means, as described above. The methods and apparatus of our invention can be used for all types of metal-removing cutting tools such as, for example, milling cutters, drills, planing tools, and the like, independently of which type of work material the particular cutting tool is to operate upon. Thus, depending upon the required configuration of the cutting portion of the tool, the mold of our invention can have most widely varying constructions to provide a cutting tool with the desired configuration at its cutting portion. In the case, however, where our invention is used for depositing a harder cutting metal on the tip portions of sawteeth, the mold of our invention will have the construction described above and shown in particular in FIGS. 1-3.

As was pointed out above, when the embodiment of FIG. 5 is used so that the heating takes place by way of a burner, the plunger, the supply means 24, and the heating means 16 need not be used.

It has also been found of particular advantage to coat the graphite mold with an inner layer of silicon carbide and an outer layer of zirconium oxide. Thus the graphite body proper is electrically conductive and therefore suitable for inductive heating. The silicon carbide layer covers and protects the graphite body from the ambient air and thereby prevents oxidation thereof even when the body is heated. However, the silicon carbide layer has a disadvantage in that it has a great tendency to adhere firmly to the hard metal which may be sprayed into the mold in molten or liquid form. Consequently, the zirconium oxide layer is provided to completely cover the silicon carbide layer, because zirconium carbide has no affinity for the hard metal.

We claim:

1. In an apparatus for providing a cutting tool with a cutting portion formed of a metal harder than a base metal part of the cutting tool which carries the cutting portion thereof, mold means formed with a hollow interior having a configuration corresponding to that of the cutting portion, said mold means being adapted to receive the base metal part of the tool as well as a charge of the harder metal in said hollow interior, said mold means consisting of at least two mold components, heating means coacting with said mold means and the base metal part therein for heating said mold means and said base metal part as well as the harder metal in said mold means until the harder metal assumes the configuration of the interior of said mold means and becomes intimately bonded with the softer base metal, and moving means operatively connected to said mold components for moving them apart from each other after setting of the harder metal in said mold means, said mold means being made of a metal which has a small coefficient of thermal expansion, which can withstand a temperature of at least up to 3,000° C., which is nonoxidizing, and which will not cling to the molten and subsequently set harder metal in said mold means which forms the cutting portion of the tool, said mold means being made of graphite coated with a metal selected from the group consisting of titanium disilicide, boronitride, zirconium oxide, and silicon carbide.

2. The combination of claim 1 and wherein said heating means is electrical and is connected into a circuit which includes the graphite of said mold means.

3. In an apparatus for providing a cutting tool with a cutting portion formed of a metal harder than a base metal part of the cutting tool which carries the cutting portion thereof, mold means formed with a hollow interior having a configuration corresponding to that of the cutting portion, said mold means being adapted to receive the base metal part of the tool as well as a charge of the harder metal in said hollow interior, said mold means consisting of at least two mold components, heating means coacting with said mold means and the base metal part therein for heating said mold means and said base metal part as well as the harder metal in said mold means until the harder metal assumes the configuration of the interior of said mold means and becomes intimately bonded with the softer base metal, and moving means operatively connected to said mold components for moving them apart from each other after setting of the harder metal in said mold means, a tip portion of a tooth of a saw blade forming the softer base metal of the tool which is received in said mold means and said harder metal being a cutting tooth portion bonded to said tip portion, said components of said mold means being mirror images of each other and receiving said tip portion therebetween with said components respectively situated at opposite sides of a saw blade which carries said tip portion of said tooth thereof, said mold components respectively having inner side surface portions respectively engaging opposed side surfaces of said blade in the region of said tip portion thereof and said side surface portions of said mold components being respectively formed with depressions determining the configuration of side surfaces of the harder metal cutting portion which is molded onto said tip portion, said depressions being defined in part by forward edge portions situated in the region of a front edge of said tip portion and together determining the thickness of the cutting portion, said front edge portions engaging each other in the plane of the saw blade and extending forwardly and upwardly from a predetermined elevation of the front edge of the tip portion of the tooth, each of said front edge portions extending through approximately half the thickness of the tip portion and said mold components respectively having engaging surfaces engaging each other and extending forwardly from said edges in a plane parallel to the saw blade plane.

4. The combination of claim 3 and wherein said pair of mold components respectively have projecting portions forming a rear edge of said depressions and extending over and engaging a rear edge of the tip portion of the tooth, said rear edge portions of said mold components extending upwardly from the rear edge portion of the tooth and extending from the latter upwardly to an open top end of said mold means where said mold means is formed with a filling opening defined by said depressions and said front and rear edges thereof, and plunger means movable into said filling opening for closing the latter and for engaging the rear edge of the tooth in said mold means.

5. The combination of claim 4 and wherein said moving means includes a pair of carriers respectively carrying said mold components and respectively movable transversely with respect to the plane of the saw blade toward and away from the latter.

6. In an apparatus for providing a cutting tool with a cutting portion formed of a metal harder than a base metal part of the cutting tool which carries the cutting portion thereof, mold means formed with a hollow interior having a configuration corresponding to that of the cutting portion, said mold means being adapted to receive the base metal part of the tool as well as a charge of the harder metal in said hollow interior, said mold means consisting of at least two mold components, heating means coacting with said mold means and the base metal part therein for heating said mold means and said base metal part as well as the harder metal in said mold means until the harder metal assumes the configuration of the interior of said mold means and becomes intimately bonded with the softer base metal, and moving means operatively connected to said mold components for moving them apart from each other after setting of the harder metal in said mold means, said mold means being made of a metal which has a small coefficient of thermal expansion, which can withstand a temperature of at least up to 3,000° C., which is nonoxidizing, and which will not cling to the molten and subsequently set harder metal in said mold means which form the cutting portion of the tool, said mold means being made of graphite coated with an inner layer of silicon carbide and an outer layer of zirconium oxide.

* * * * *